No. 651,530. Patented June 12, 1900.
J. LINDALL.
SNOW PLOW.
(Application filed Jan. 2, 1900.)

(No Model.)

Witnesses
Jas J. Maloney
Nancy P. Ford

Inventor:
John Lindall,
by J. P. and H. Livermore
Attys.

UNITED STATES PATENT OFFICE.

JOHN LINDALL, OF MEDFORD, MASSACHUSETTS.

SNOW-PLOW.

SPECIFICATION forming part of Letters Patent No. 651,530, dated June 12, 1900.

Application filed January 2, 1900. Serial No. 130. (No model.)

*To all whom it may concern:*

Be it known that I, JOHN LINDALL, of Medford, county of Middlesex, and State of Massachusetts, have invented an Improvement in Snow-Plows, of which the following description, in connection with the accompanying drawings, is a specification, like letters on the drawings representing like parts.

The present invention relates to a snow-plow of that type commonly used in street-railways in which the snow is removed from the track by a diagonal blade or scraper extending under the body of the car across the track, the said scraper being provided with an outrigger or leveler connected therewith at its rear end to level the snow heaped up by the main blade. It is frequently necessary to move the outrigger out of the way for the purpose of clearing obstacles or in cases where the mass of snow is too great to be properly acted upon by the said leveler.

In snow-plows as heretofore constructed the leveler has been arranged so as to be vertically movable with relation to the blade or scraper and pivotally connected therewith, so that it can be lifted by means of a rope or otherwise when it has to be carried away from its normal operative position.

In accordance with the present invention the outrigger is arranged to have a lateral as well as vertical movement with relation to the main blade and is provided with an adjusting device whereby the angle can be varied and the outrigger fastened in any desired position, the adjusting and fastening devices being so arranged that when released the outrigger will merely swing in parallel to the body of the plow in response to the frictional resistance of the surface along which it is traveling.

As herein shown, the outrigger is connected near its rear end with a flexible controlling device, such as a chain, and the said chain is provided with adjusting means whereby it can be tightened or slackened at will to thereby vary the adjustment of the outrigger or release the same altogether.

Figure 1:
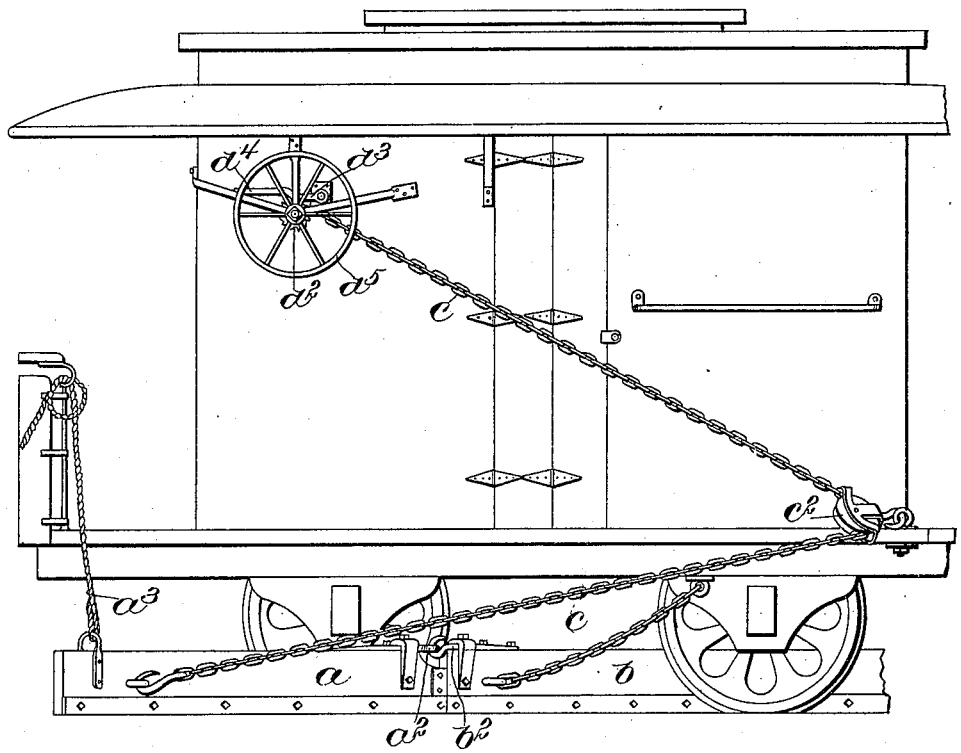
Figure 2:
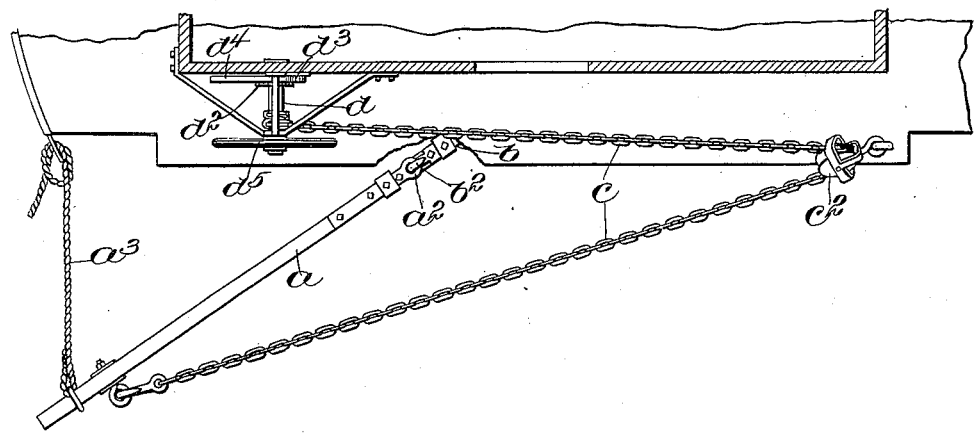

Figure 1 is a side elevation of a plow embodying the invention; and Fig. 2, a partial plan view of the same, the body of the plow being shown in section.

As herein shown, the outrigger $a$ is connected with the main plow-blade $b$ by a suitable pivotal joint, such as a staple $a^2$ and hook $b^2$, whereby it is capable of both vertical and lateral movement with relation to the blade $b$. The said outrigger $a$ may be provided, as shown, with a lifting-rope $a^3$, this, however, being non-essential when the outrigger is arranged in accordance with the present invention. To retain the said outrigger at any desired angle to the blade $b$, it is shown as provided with an adjustable controlling device $c$, such as a chain or cable, provided with an actuator $d$, whereby the adjustment may be varied and the controller locked in any desired position.

As herein shown, the adjusting device is located near the rear of the plow and may consist of a windlass provided with a ratchet $d^2$ and pawl $d^3$, the said pawl having an extension or handle $d^4$, by means of which it may be released to let the outrigger go free. The windlass may be provided with a suitable handle or wheel $d^5$, so that it can be turned to any desired position to vary the angle of the outrigger $a$, which is automatically locked by means of the pawl $d^3$. When, therefore, there is a large body of snow affording great resistance to the outrigger, the said outrigger may be set at an angle to the blade $b$ by so adjusting the chain that the end of the outrigger will be a little farther to the rear, so that part of the snow can be leveled, although it may be impracticable to attempt to level it for a distance equal to that covered by the outrigger when in alinement with the blade $b$. Should it be necessary, furthermore, to pass an obstacle near the side of the track or should it be desired to run the plow without using the outrigger, the controller $c$ may be released, as by operating the pawl $d^3$, so that the outrigger will automatically swing back out of the way.

As herein shown, the controller $c$ is passed over a pulley $c^2$, the purpose of which is merely to cause the said controller to act upon the outrigger along the line of resistance and at the same time to conveniently locate the actuating device. It is obvious, however, that the adjusting mechanism for the controlling device may be of any suitable or usual kind and located at any convenient point upon the body of the plow, it being desirable of course to vary the construction, so as to adapt it for plows of various types and to arrange the parts so that the adjusting means may be conveniently located. It is not therefore intended to limit the invention to the specific construction shown and described, since modifications may be made without departing from the invention.

I claim—

In a snow-plow for street-railways, the combination with a rearwardly-inclined diagonal snow-removing blade, of an outrigger or leveler pivotally connected therewith, a flexible controlling device extending forward from said outrigger to a pulley connected with the plow-body and rearward from said pulley to a windlass or equivalent device located near the rear end of the plow, the said pulley and the said windlass, as set forth.

In testimony whereof I have signed my name to this specification in the presence of two subscribing witnesses.

JOHN LINDALL.

Witnesses:
HENRY J. LIVERMORE,
NANCY P. FORD.